US011532114B2

(12) United States Patent
Bonansea

(10) Patent No.: US 11,532,114 B2
(45) Date of Patent: *Dec. 20, 2022

(54) CUSTOMIZABLE ANIMATIONS FOR TEXT MESSAGES

(71) Applicant: EMONSTER INC, Seattle, WA (US)

(72) Inventor: Enrique Bonansea, Tokyo (JP)

(73) Assignee: EMONSTER INC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,509

(22) Filed: May 23, 2022

(65) Prior Publication Data

US 2022/0284653 A1     Sep. 8, 2022

Related U.S. Application Data

(63) Continuation of application No. 17/210,404, filed on Mar. 23, 2021, now Pat. No. 11,341,707, which is a continuation of application No. 15/723,068, filed on Oct. 2, 2017, now Pat. No. 10,957,088, which is a continuation of application No. 14/811,426, filed on Jul. 28, 2015, now Pat. No. 9,779,532.

(60) Provisional application No. 62/031,752, filed on Jul. 31, 2014.

(51) Int. Cl.
*G06T 13/80* (2011.01)
*H04L 51/10* (2022.01)
*H04W 4/14* (2009.01)

(52) U.S. Cl.
CPC .............. *G06T 13/80* (2013.01); *H04L 51/10* (2013.01); *H04W 4/14* (2013.01)

(58) Field of Classification Search
CPC ......... G06T 13/40; G06T 13/00; G06T 13/80; G06T 13/20; A63F 13/10; H04W 4/14; H04W 4/12; H04W 88/184; H04M 1/72552; H04M 3/42382; H04L 51/18
See application file for complete search history.

(56) References Cited

U.S. PATENT DOCUMENTS

| | | |
|---|---|---|
| 6,453,294 B1 | 9/2002 | Dutta et al. |
| 7,216,092 B1 | 5/2007 | Weber et al. |
| 8,639,214 B1 | 1/2014 | Fujisaki |
| 8,832,201 B2 | 9/2014 | Wall |
| 8,949,461 B2 | 2/2015 | Steele et al. |
| 9,405,821 B1 | 8/2016 | Bessis |
| 9,779,532 B2 | 10/2017 | Bonansea |
| 2003/0011643 A1 | 1/2003 | Nishihata |
| 2003/0110450 A1 | 6/2003 | Sakai |
| 2004/0179037 A1 | 9/2004 | Blattner et al. |
| 2004/0199906 A1 | 10/2004 | McKnight et al. |
| 2006/0019636 A1 | 1/2006 | Guglielmi et al. |
| 2006/0199575 A1 | 9/2006 | Moore et al. |
| 2008/0182566 A1* | 7/2008 | Camp, Jr. ............... H04L 51/18 455/418 |
| 2010/0162138 A1 | 6/2010 | Pascal et al. |

(Continued)

OTHER PUBLICATIONS

Unicode 7.0.0 Standard, https://www.unicode.org/versions/Unicode7.0.0/ (last visited Jul. 29, 2014).

*Primary Examiner* — Todd Buttram
(74) *Attorney, Agent, or Firm* — AEON Law, PLLC; Adam L. K. Philipp; David V. H. Cohen

(57) ABSTRACT

A method and system for transforming simple user input into customizable animated images for use in text-messaging applications.

22 Claims, 7 Drawing Sheets

(56) References Cited

U.S. PATENT DOCUMENTS

| | | |
|---|---|---|
| 2011/0246890 A1 | 10/2011 | Mellamphy et al. |
| 2011/0296324 A1 | 12/2011 | Goossens et al. |
| 2012/0001924 A1 | 1/2012 | Richardson |
| 2012/0101805 A1 | 4/2012 | Barbosa et al. |
| 2013/0086008 A1 | 4/2013 | Souza et al. |
| 2014/0372541 A1 | 12/2014 | Feghali |
| 2015/0287403 A1 | 10/2015 | Zaslansky et al. |
| 2015/0302628 A1* | 10/2015 | Ye .................. G06F 3/04847 715/721 |
| 2016/0035123 A1 | 2/2016 | Bonansea |
| 2018/0082461 A1 | 3/2018 | Bonansea |
| 2021/0209826 A1 | 7/2021 | Bonansea |

\* cited by examiner

CUSTOMIZABLE ANIMATIONS FOR TEXT MESSAGES

CROSS-REFERENCE TO RELATED APPLICATIONS

This application claims priority to non-provisional U.S. patent application Ser. No. 17/210,404, filed Mar. 23, 2021 and issued as U.S. Pat. No. 11,341,707 on May 24, 2022; to non-provisional U.S. patent application Ser. No. 15/723,068, filed Oct. 2, 2017 and issued as U.S. Pat. No. 10,957,088 on Mar. 23, 2021; and to non-provisional U.S. patent application Ser. No. 14/811,426, filed Jul. 28, 2015 and issued as U.S. Pat. No. 9,779,532 on Oct. 3, 2017; and claims the benefit of provisional U.S. Patent Application No. 62/031,752, filed Jul. 31, 2014. The above-cited applications are hereby incorporated by reference, in their entireties, for all purposes. The Application Data Sheet filed herewith forms a part of the present application, and all priority documents to which it refers are incorporated by reference herein in their entirety.

FIELD

This disclosure is directed to the field of communication software, particularly text-messaging applications on mobile devices.

BACKGROUND

Text messaging is a method of communicating short messages between various types of devices. Text messages are transmitted over the Short Message Service (SMS) and Multimedia Messaging Service (MMS) protocols. Messages sent via SMS are limited to 160 characters in length. MMS messages may contain longer strings of text, as well as photo, audio, or video data. Messages sent over both protocols are commonly referred to as "text messages" or "texts."

Because SMS messages are limited to 160 characters in length, users have developed shorthand conventions for expressing common sentiments in such messages, such as "LOL" ("laughing out loud"), "ROFL" ("rolling on the floor laughing"), "BRB" ("be right back"), "NP" ("no problem"), and many others. Although MMS messages do not share the same length limitation, such messages typically are similarly brief due to a variety of factors, including user convention, device interface considerations, historical technological limitations, and bandwidth concerns. Thus, these shorthand conventions are common in text messages sent both by SMS and by MMS.

Some of these common abbreviations are known as emoticons. Emoticons use text characters to depict certain emotions, usually as representations of facial expressions. For example, probably the most common emoticon is a "smiley face," typically drawn as two or three characters: ":)" or ":-)". Other common emoticons include ";)" (a wink), ":D" (an extra-large or open-mouthed smile), and ":P" (tongue sticking out). Emoticons allow text users to express complex emotions using very few characters, conserving available space in text messages and reducing typing requirements.

Another type of symbol used in text messages is known as an emoji. Emojis are essentially pictographic versions of emoticons or other symbols. In order to use an emoji, a user may type a specific character sequence indicating to his text-messaging software that he wishes to send an associated emoji image, though some text-messaging software also allows users to directly select the desired image rather than typing in a character sequence. The text-messaging software then replaces the specified character sequence with the appropriate image and sends it to the intended recipient. Some such emojis are static images, while others may be animated. The Unicode Standard character set adopted several hundred emojis in version 6.0, and added approximately 250 more in the latest version, 7.0. The current Unicode Standard may be found at http://www.unicode.org/versions/Unicode7.0.0/ (last visited Jul. 29, 2014), and is hereby incorporated by reference in its entirety.

One drawback to emojis, however, is that the images used are drawn from fixed sets of images built in to the users' text-messaging software. Users are thus unable to customize the images they send to express any sentiment beyond those already provided with their software. Moreover, the set of animated emojis may be particularly limited compared to the various thoughts that a user may wish to express with an animated image in a text message, and the animations are typically limited to in-place images that cannot move in relation to the surrounding characters.

DESCRIPTION

Figure 1:
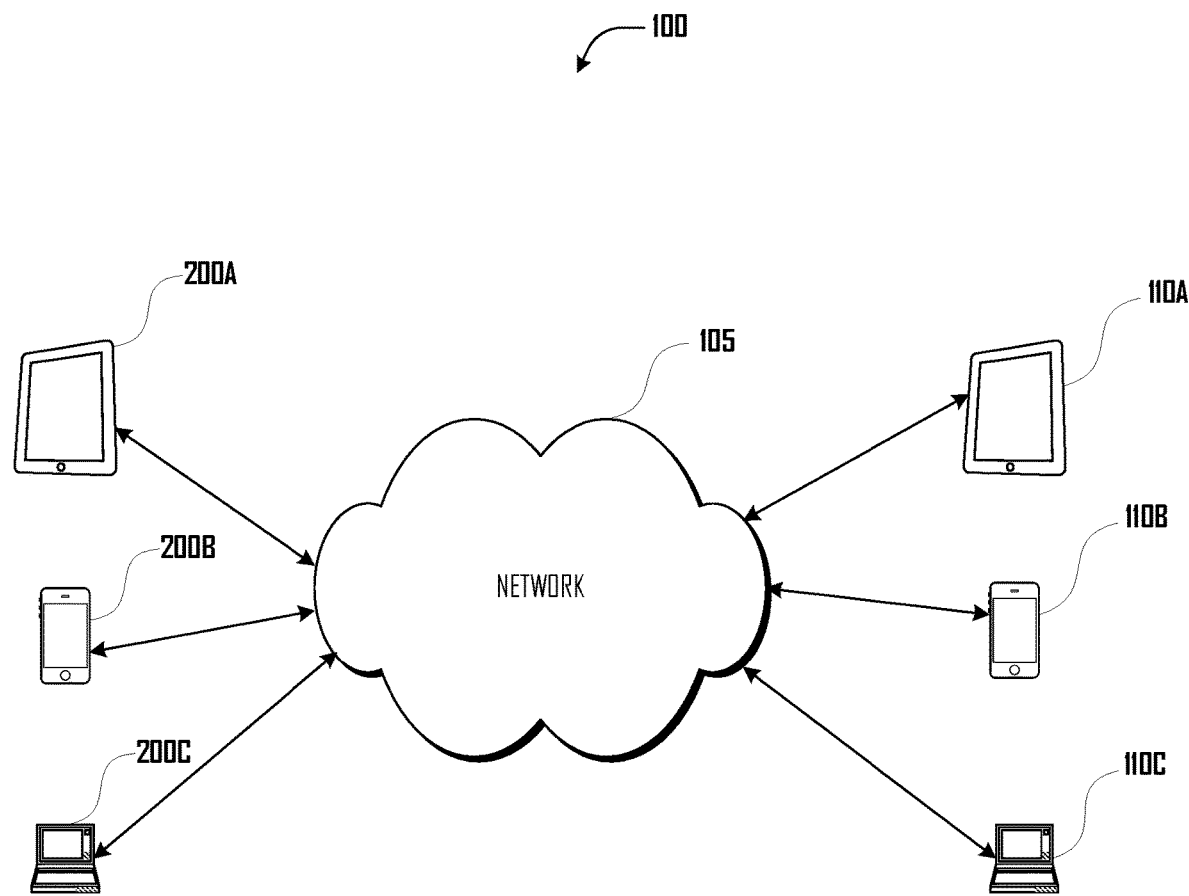
FIG. 1 is a network and device diagram illustrating exemplary computing devices configured according to embodiments disclosed in this paper.

The presently disclosed method and system presents a simple mechanism for allowing users to use, combine, and animate any arbitrary sequence of characters or images to be sent in a text message. An exemplary embodiment is described in which an emoji coding language (ECL) is used to allow a user to specify various properties, such as sequencing, spacing, and images or character sequences that he wishes to animate. The embodiment then processes the user's ECL input, converts it to a format that typical text-messaging software can render, and sends the message. The recipient then sees the sender's intended animation, regardless of the text-messaging software on the recipient's device and even if the message includes images not otherwise present on the recipient's device.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional methods, or combinations of illustrated methods, may be added to or combined without limiting the scope to the embodiments disclosed herein.

FIG. 1 depicts a communications system 100 such as those operated by mobile-phone carriers. Sender devices 200 such as tablet 200A, cell phone 200B, and personal computer 200C connect to network 105 in order to exchange information, including text messages, with other users using receiving devices such as tablet 110A, cell phone 110B, and personal computer 110C. Network 105 could be a private network such as those operated by mobile telephony operators, or a public network such as the Internet. Network 105 could also comprise combinations of various public and private networks.

Figure 2:
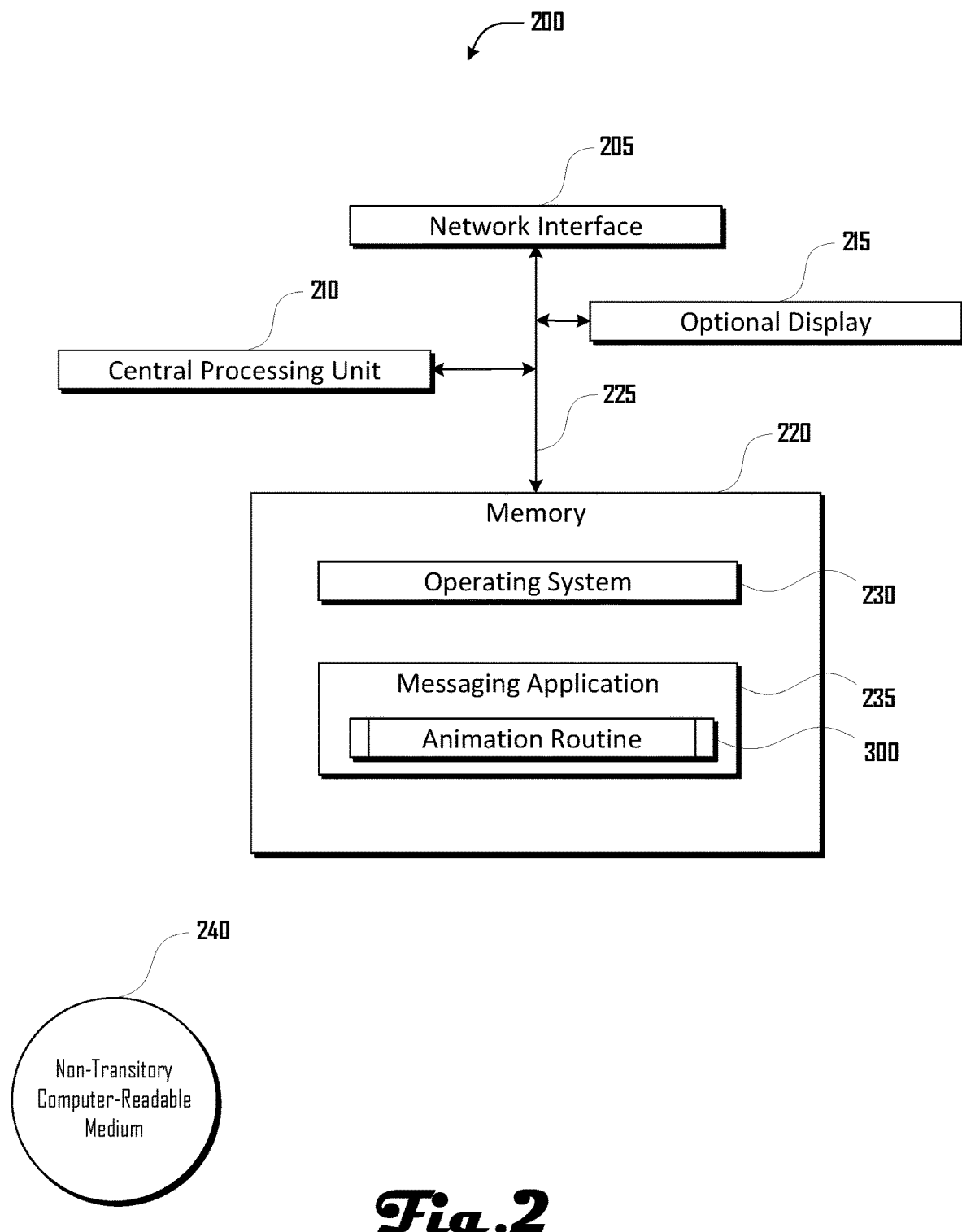
FIG. 2 illustrates several components of an exemplary computing device capable of sending and receiving text messages in accordance with the present disclosure.

FIG. 2 depicts several components of an exemplary computing device 200 capable of sending and receiving text messages in accordance with the present disclosure. In various embodiments, computing device 200 may be a mobile phone, tablet, desktop PC, laptop, server, workstation, set-top box, appliance, or other computing device that is capable of performing operations such as those described herein. In some embodiments, computing device 200 may include many more components than those shown in FIG. 2. However, it is not necessary that all of these generally conventional components be shown in order to disclose an illustrative embodiment.

Computing device 200 includes a bus 225 interconnecting several components including a network interface 205, a central processing unit 210, an optional display 215, and a memory 220.

Memory 220 generally comprises a random-access memory and permanent non- transitory mass storage device, such as a hard disk drive or solid-state drive. Memory 220 stores program code for an operating system 230 and an exemplary messaging application 235 ("App"). The App comprises program code for animation routine 300 (see FIG. 3). These and other software components may be loaded into memory 220 using a drive mechanism (not shown) associated with a non-transitory computer-readable medium 240, such as a floppy disk, tape, DVD/CD-ROM drive, memory card, or the like.

Figure 3:
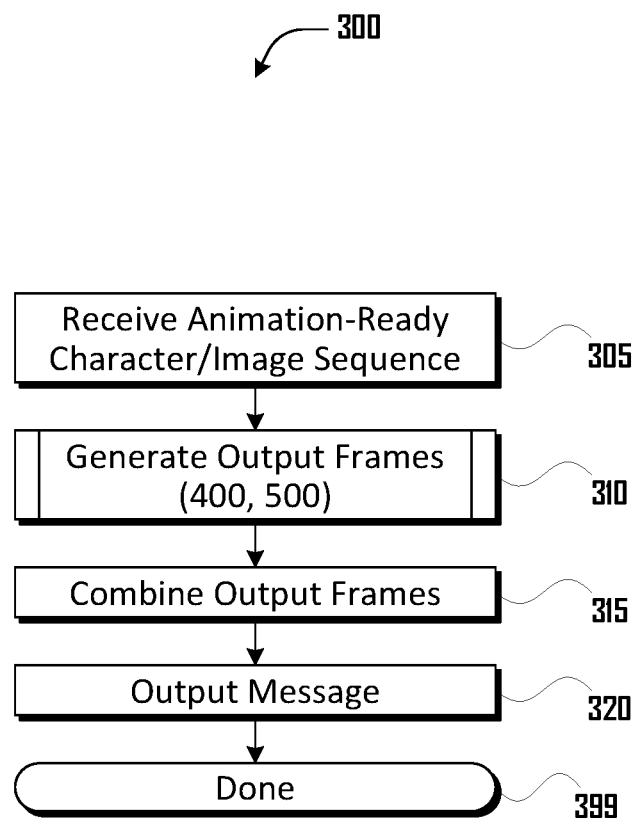
FIG. 3 illustrates an animation routine which converts user input into a desired animation.

FIG. 3 shows animation routine 300, by which the App converts user input into the desired animation. The App first receives the user's input, possibly including ECL code, in box 305. In box 310, the App processes the user input, as described by animation subroutines 400 and 500, in order to generate the series of images for animation ("output frames") that the user requested. The App combines the generated output frames into an animated GIF file in box 315, and then outputs the animated GIF in box 320. Animation routine 300 then ends in block 399.

Targets for the output operation of box 320 could include a display on the user's device (e.g., to allow for review before sending), a communications network that can deliver the message to the intended recipient, as with communications network 105, or any other target that may prove useful. If the output target is a communications network such as network 105, the animation may be sent as an attachment to an MMS message. By sending the message as an animated GIF attached to an MMS message, any text-messaging program used by the recipient should be able to render the animation, regardless of the type of device (e.g., tablet, cell phone, PC), platform (e.g., iOS or Android), or particular text-messaging software used by the recipient. Techniques for combining several image frames into an animated GIF and for sending an animated GIF as an MMS attachment are well known to those skilled in the art.

Figure 4:
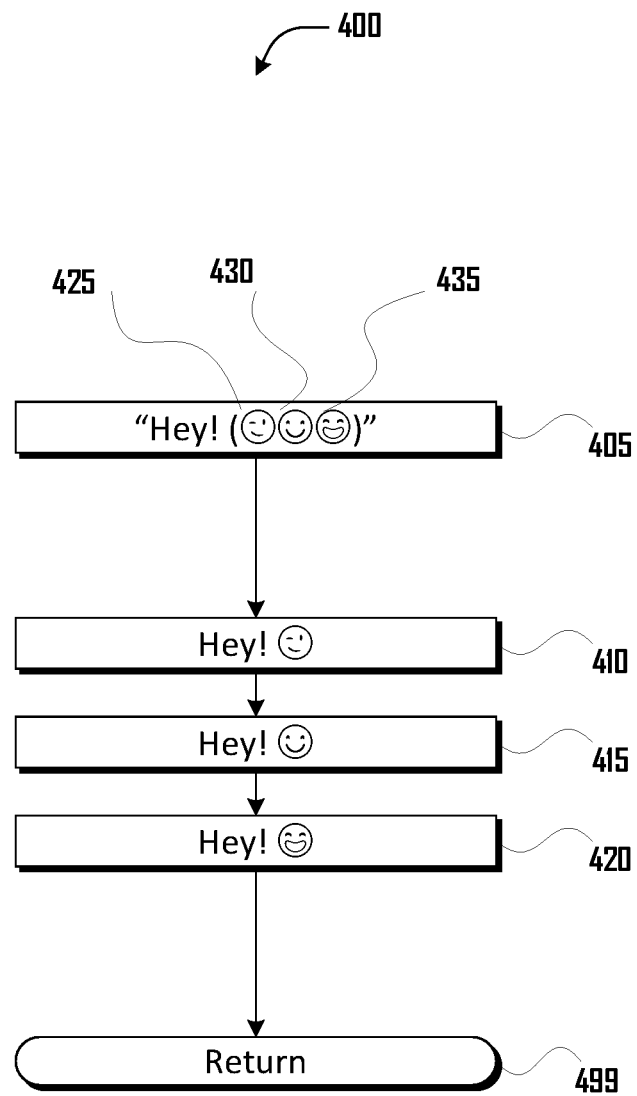
FIG. 4 illustrates an animation subroutine, showing sample user input and the corresponding generated output frames.

FIG. 4 depicts animation subroutine 400, showing sample user input and the corresponding generated output frames. Block 405 depicts an input sequence of characters and images, consisting of the word "Hey!" followed by a space, an open parenthesis, emoji images 425, 430, and 435, and a close parenthesis. In block 405, subroutine 400 parses this input and decodes the animation commands that the user has included in the text. Subroutine 400 recognizes the parentheses as indicating a sequence of characters or images that the user wishes to animate. Subroutine 400 then generates a sequence of three output frames as shown in boxes 410, 415, and 420. Each output frame contains the text "Hey!" followed by a space and one of the three designated emoji images, in the order in which the user entered them. In box 499, subroutine 400 returns to animation routine 300, where generated output frames 410, 415, and 420 are combined and output in boxes 315 and 320, as described above.

The sequence of characters and images processed in subroutine 400 employs a simple syntax in which each character or image placed between matched pairs of parentheses corresponds to a single output frame. Thus, because block 405 contains three emoji images (and no spaces) between the parentheses, the App generates three sequential output frames 410, 415, and 420 in order to produce the resulting animation.

The user may, however, wish to create an animation wherein the selected characters or images move within the resulting output frames. The simple syntax shown in block 405 would not allow for this, because subroutine 400 would transform any additional spacing characters into their own distinct output frames.

Figure 5:
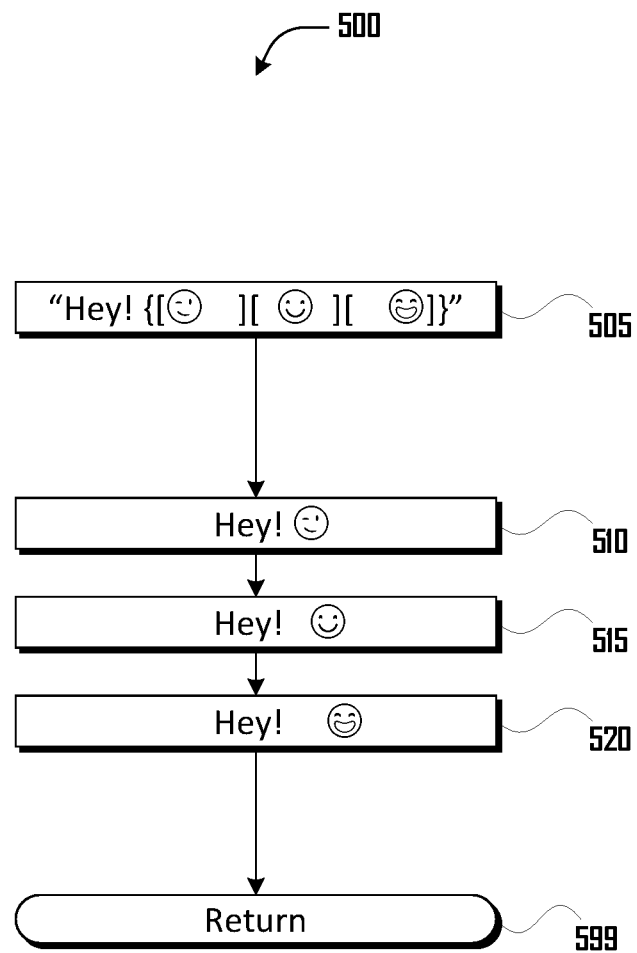
FIG. 5 illustrates an animation subroutine, utilizing an alternate syntax to provide additional functionality.

FIG. 5 shows animation subroutine 500, utilizing an alternate syntax employed by the App in order to provide this additional functionality. Block 505 depicts a sequence of characters and images consisting of the word "Hey!" followed by a space, a left curly brace, three matched pairs of square brackets containing distinct sequences of characters and emoji images, and then a right curly brace. When subroutine 500 encounters a matched pair of curly braces containing one or more matched pairs of square brackets, it interprets the contents of each matched pair of square brackets as corresponding to a single desired output frame. Subroutine 500 thus interprets the sequence of characters and images shown in block 505 as a request to generate three distinct output frames corresponding to the contents of each matched pair of square brackets, respectively. Thus, by using spaces as shown in block 505, the sender can create an animation that appears to move laterally within the resulting output frames, as shown in boxes 510, 515, and 520. Subroutine 500 returns to animation routine 300 at box 599.

The parentheses shown in box 405 operate simply as a shorthand notation for the more complete syntax used in box 505. In order to allow the user to specify simple animations with a minimum of required keystrokes, the App interprets parentheses as shown in box 405 (i.e., not contained within a matched pair of curly braces) as equivalent to the syntax shown in box 505, wherein each character within the parentheses in box 405 is used to generate a single output frame. Thus, the input shown in box 405, "Hey! (☺☺☺)" is functionally equivalent to the input "Hey! {[☺][☺][☺]}" but requires fewer keystrokes to enter.

Figure 6:
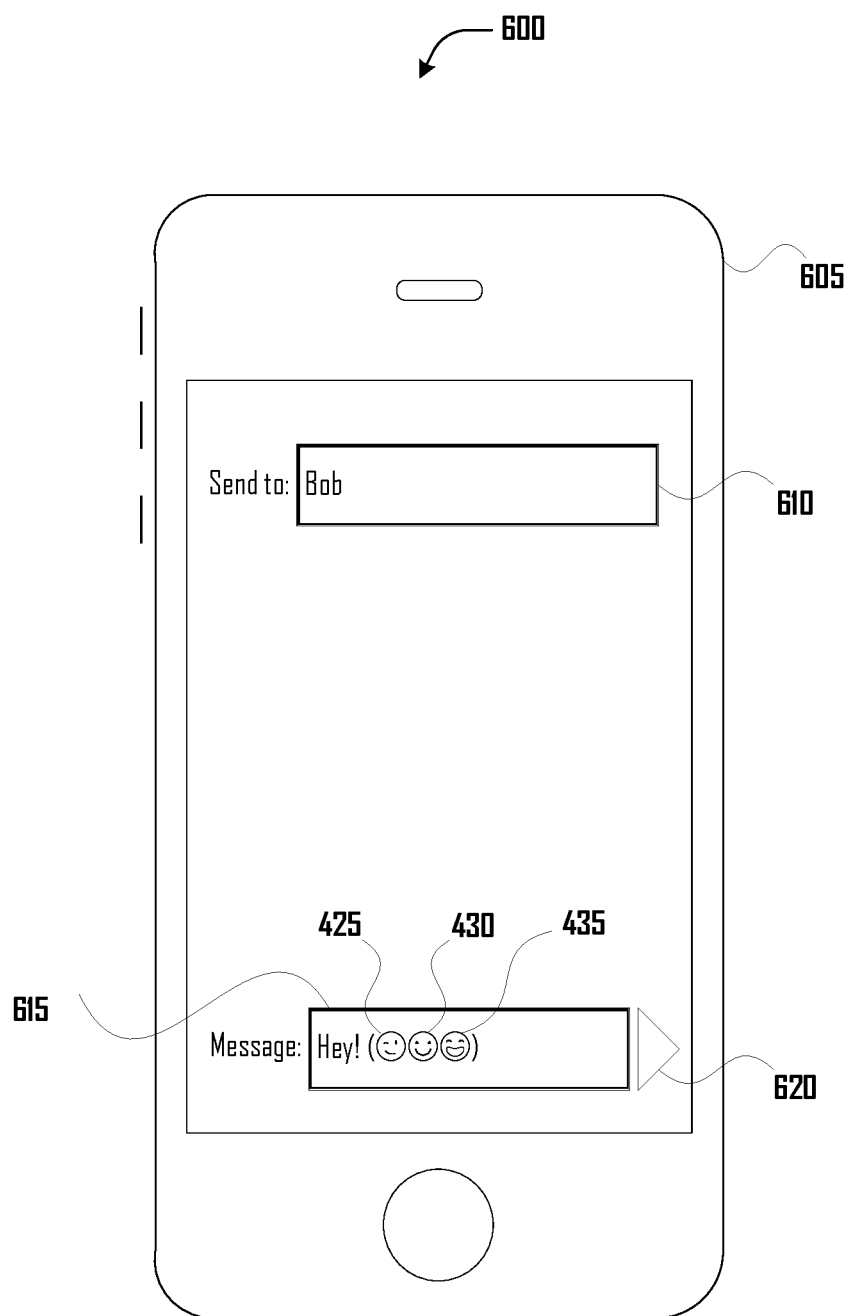
FIG. 6 illustrates an exemplary user interface of a computing device for sending a message in accordance with the present disclosure.

FIG. 6 depicts an exemplary user interface for sending a message in accordance with the present disclosure. Sender Alice opens the above-described App on her mobile phone 605. In selection field 610, Alice specifies that she wishes to send a message to recipient Bob. In input field 615, Alice enters the message she wishes to animate and send, including text characters and emoji images 425, 430, and 435. Alice then selects button 620, indicating that she wishes to animate the message according to animation routine 300 and then send it to Bob.

Figure 7:
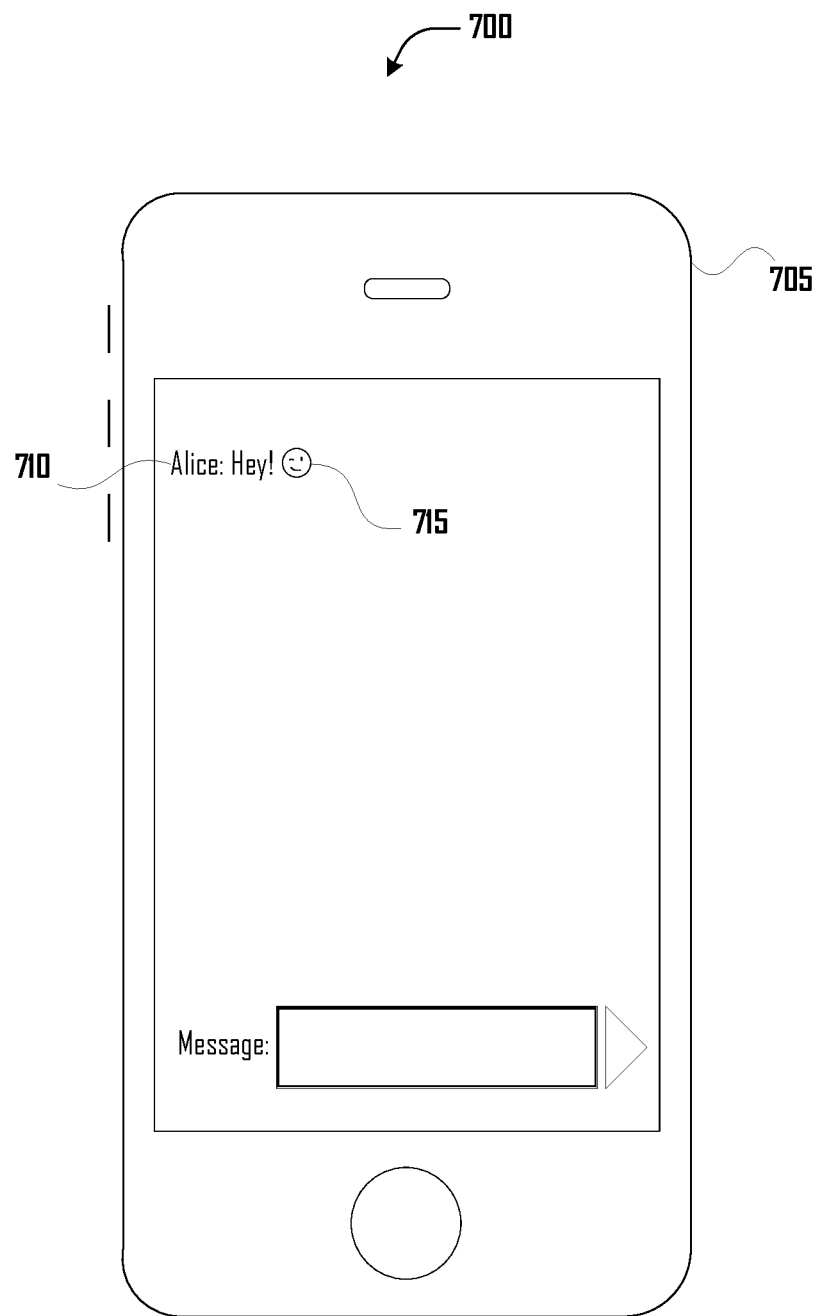
FIG. 7 illustrates an exemplary user interface of a computing device after receiving a message prepared and sent in accordance with the present disclosure.

After Alice's message is processed and sent, Bob receives it as shown in FIG. 7. Bob's mobile phone 705 indicates that it has received an MMS message 710 from Alice. The MMS message includes an attachment consisting of a three-frame animated GIF. In accordance with the normal operation of text-messaging software, the animated GIF is displayed in-line in Bob's interface, showing each frame in sequence. Thus, Bob sees the word "Hey!" followed by a space and then image 715. Image 715 initially consists of emoji 425. As Bob's text-messaging software renders subsequent frames of the animated GIF, image 715 appears to change into emoji 430, and then emoji 435. Bob thus sees the animation as specified by Alice. Because the message is transmitted in a standardized format, namely an animated GIF attached to an MMS message, Bob sees the animation as intended by Alice even if he has a different type of phone, different text-messaging software, or a different network carrier than her.

Many variations in the above-described details of the App, or features not included in the App, are possible while remaining within the scope of the present disclosure. Some examples include, without limitation:

Syntax

Additional syntax could prove useful for certain types of desired animations. For example, if the sender wished to animate an emoticon, he may wish to include parentheses as part of the animation. For example, the sequence "(^_^)"->"(^_-)" (i.e., a wink) might be an animation a user would wish to send. Because the above-described App interprets parentheses as special characters, however, this type of animation would not be possible. The inclusion of "escape characters," however, such as a backslash or tick mark, could allow a sender to specify, for example, that he wants the character immediately before or after the escape character to be interpreted as part of the message itself and not as part of an animation command. Thus, using a backslash as an escape character, the sender could enter the text string "Hey! {[\(^_\)][\(^_\]}" to achieve the desired message, including an animated emoticon containing parentheses. The use of escape characters in this way is well known to those of ordinary skill in the art.

Syntax additions could also provide further capabilities, such as specifying animation parameters (e.g., time delay between output frames) on a per-message basis. Additional syntax may also be useful for incorporating additional types of animations, as described below, and other uses. The designation and use of specific syntax to enable this type of functionality is well known to those skilled in the art.

Animation Types

Beyond the types of animations described above, further animation capabilities may be desirable. For example, users may wish to incorporate rotation or horizontal or vertical flipping of characters or images into their animations. By specifying certain characters to indicate these commands (e.g., the character """ could be interpreted as a command to vertically flip the next character or image in subsequent output frames), other embodiments could easily incorporate these types of features. Other uses for such additional commands could include, e.g., specifying different colors or altering the size of the animated characters or images.

Other embodiments could also implement logic to smoothen the output animation by interpolating between the sender-specified ("source") output frames, automatically generating additional output frames, and inserting the additional output frames between the source output frames as appropriate. Techniques for interpolating between two images are well-known to those skilled in the art.

Animation Parameters

Users may wish to have control over certain parameters governing the animations generated from their input. For example, one sender may want a delay of one second between each output frame, whereas another sender may want a delay of five seconds. Or a sender may wish to generate an animation that replays the output frames once forward and then once backward. Or, if an embodiment includes interpolation capability as described above, certain additional parameters may be associated with that functionality, such as the granularity of the interpolation (i.e., how many interpolated frames to generate for each pair of adjacent source output frames). The present disclosure is intended to encompass all embodiments with such additional features.

Messaging Protocols

Although the messages described in the exemplary embodiments are text messages transmitted via the MMS protocol with animated GIF attachments, the present disclosure is not limited to those technologies. Instead, the scope of the disclosure is intended to include any messaging technology, whether or not currently existing, in which a coding language similar to the presently disclosed ECL could prove useful in allowing senders to create flexible animations out of arbitrary sequences of characters and images. For example, various embodiments could operate in conjunction with instant-messaging software such as Skype, manufactured by Microsoft Corporation of Redmond, Wash., Google+ Hangouts, manufactured by Google, Inc., of Mountain View, Calif., and others, without departing from the scope of the present disclosure.

Application and System Features

Certain embodiments may provide additional application- or system-level features or options. For example, one potential embodiment could show the user the generated animation prior to sending the message, in order to allow for any necessary corrections. In another embodiment, there may be no user-level application at all; instead, animation routine 300 could be implemented as a software module that interacts with third-party text-messaging applications, so that the user can use a text-messaging application of his choice but still enjoy the benefits of the presently disclosed method and system. Animation routine 300 could even be implemented by a network operator at the network level, so that senders could create and send custom animations according to the present disclosure without needing to install any special software on their devices at all. All such embodiments are within the intended scope of the present disclosure.

I claim:

1. A system to customize emoji for messaging, the system comprising one or more computer systems including one or more processors and memories containing program code for execution by the one or more processors, the one or more computer systems configured to:

parse an input sequence according to a syntax to identify:

one or more emoji, and
a syntax character that is coded in the syntax as usable to modify a rendering of the one or more emoji;
interpret the syntax character as a command to modify the rendering of the one or more emoji, such that the syntax character is not rendered;
generate one or more images of the one or more emoji modified according to the syntax character; and
output the generated one or more images.

2. The system of claim 1, further comprising receiving the input sequence via a messaging interface.

3. The system of claim 1 wherein the syntax character is a single text or emoji character.

4. The system of claim 1 wherein the syntax character is coded in the syntax as usable to modify a rendering of at least one of a first emoji preceding the syntax character in the input sequence or a second emoji following the syntax character in the input sequence.

5. The system of claim 1 wherein the command to modify the rendering of the one or more emoji comprises direction to change how the first emoji appears by performing at least one of: a rotation of the first emoji, a change of a size of the first emoji, a horizontal flip of the first emoji, a vertical flip of the first emoji, a change of a color of the first emoji, and a combining of the first emoji with a different second emoji.

6. The system of claim 5 wherein the command comprises direction to modify the rendering of the first emoji before the first emoji is output.

7. The system of claim 1 wherein two syntax characters in a row both modify a rendering of the one or more emoji.

8. The system of claim 1 wherein the syntax character comprises a pair of text or emoji characters that is coded in the syntax as usable to identify a sub-sequence of the one or more emoji within the pair, such that another syntax character adjacent to the pair is usable to modify a rendering of the sub-sequence of the one or more emoji within the pair.

9. The system of claim 1 wherein the user interface includes a shorthand notation to enter one or more syntax characters of the input sequence.

10. The system of claim 1 wherein generating one or more images of the one or more emoji modified according to the syntax character comprises generating an animation.

11. The system of claim 10 wherein generating an animation comprises generating an animation frame for each of the one or more emoji.

12. The system of claim 11 wherein generating an animation comprises generating interpolated frames before or after the animation frame for each of the one or more emoji.

13. The system of claim 10 wherein the command to modify the rendering of the one or more emoji comprises controlling an animation parameter.

14. The system of claim 13 wherein controlling an animation parameter comprises governing at least one of: a delay between animation frames, an animation loop or bounce, and an interpolation granularity.

15. The system of claim 10 wherein the command to modify the rendering of the one or more emoji comprises direction to animate at least a first emoji by performing at least one of: moving the first emoji to a different location on a display, rotating the first emoji, changing a size of the first emoji, flipping the first emoji horizontally, flipping the first emoji vertically, changing a color of the first emoji, and changing the first emoji into a different second emoji.

16. The system of claim 1 wherein outputting the generated one or more images comprises sending the generated one or more images to a display.

17. The system of claim 1 wherein customizing emoji for messaging allows a user to generate an altered emoji to express a sentiment that is not part of a standard set of emoji.

18. The system of claim 1, further comprising sending the generated one or more images to a recipient over a communications network.

19. The system of claim 18 wherein sending the generated one or more images to the recipient further comprises selecting at least one of a format for the images or a recipient messaging protocol.

20. The system of claim 18 wherein sending the generated one or more images to the recipient comprises sending at least one of an MMS protocol message, an instant-messaging message, and a message for delivery through a third-party text-messaging application.

21. A non-transitory machine-readable medium having stored thereon instructions to customize emoji for messaging that, when executed by one or more processors in one or more computer systems, configure the computer systems to:
parse an input sequence according to a syntax to identify:
one or more emoji, and
a syntax character that is coded in the syntax as usable to modify a rendering of the one or more emoji;
interpret the syntax character as a command to modify the rendering of the one or more emoji, such that the syntax character is not rendered;
generate one or more images of the one or more emoji modified according to the syntax character; and
output the generated one or more images.

22. A method to allow a user to customize emoji for messaging, comprising providing machine-readable instructions executable by components of a computing system to:
parse an input sequence according to a syntax to identify:
one or more emoji, and
a syntax character that is coded in the syntax as usable to modify a rendering of the one or more emoji;
interpret the syntax character as a command to modify the rendering of the one or more emoji, such that the syntax character is not rendered;
generate one or more images of the one or more emoji modified according to the syntax character; and
output the generated one or more images.

* * * * *